H. C. EVANS.
SKELPING DIES.

No. 186,551. Patented Jan. 23, 1877.

Witnesses
James D. Kay
James K. Bakewell

Inventor
Henry C. Evans
by Bakewell & Kerr
Attys.

UNITED STATES PATENT OFFICE.

HENRY C. EVANS, OF PITTSBURG, PENNSYLVANIA, ASSIGNOR TO A. F. DALZELL, TRUSTEE FOR EVANS, DALZELL & CO., OF SAME PLACE.

IMPROVEMENT IN SKELPING-DIES.

Specification forming part of Letters Patent No. 186,551, dated January 23, 1877; application filed December 12, 1876.

*To all whom it may concern:*

Be it known that I, HENRY C. EVANS, of Pittsburg, in the county of Allegheny and State of Pennsylvania, have invented a new and useful Improvement in Skelping-Dies; and I do hereby declare the following to be full, clear, and exact description thereof, reference being had to the accompanying drawing, forming a part of this specification, in which—

Figure 1:
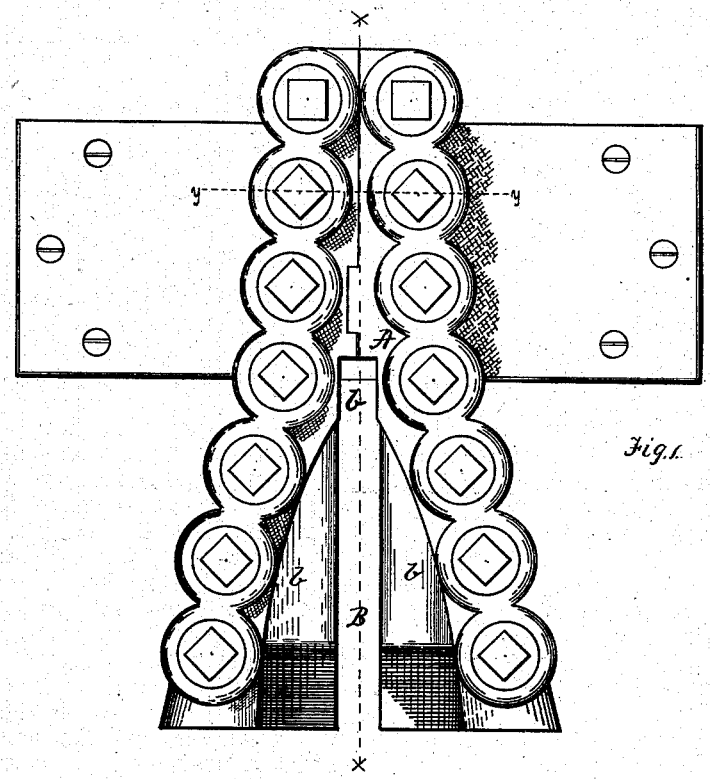
Figure 2:
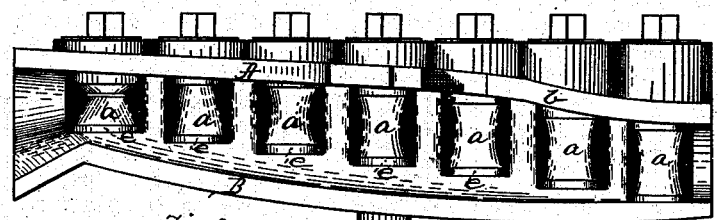
Figure 3:
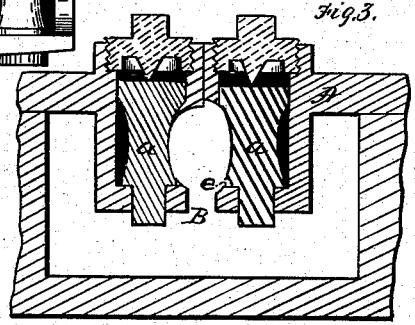

Figure 1 is a plan view of the improved skelping-die. Fig. 2 is a vertical sectional view through the line $x$ $x$. Fig. 3 is a vertical sectional view through the line $y$ $y$.

My invention relates to that class of machines known as "skelping-dies;" and consists in a skelping-die or box-frame provided with rollers, so constructed and arranged as to bend the bar or sheet from which the skelp is formed into a tubular form, ready for welding.

Wrought-iron pipe is now generally manufactured by drawing a bar or sheet of malleable iron, at a red heat, through a skelping-die, so constructed that the edges of the bar or sheet will come in contact with the circular or ellipsoidal sides of the die, and thus will be formed into a pipe or tube skelp as it passes through the die.

The objections to this process are, that the skelp is apt to buckle, and if any cinder, which is liable to stick to the heated bar or sheet, gets into the die, it will either cut grooves in the die or will make slits or scores in the skelp. There is also great friction caused by the skelp rubbing against the sides of the skelp-die as it is drawn through.

My improved skelping-die obviates all these difficulties, thereby saving labor and expense.

I will now proceed to describe my invention, so that others skilled in the art may use and manufacture the same.

Like letters refer to like parts wherever they occur.

The skelping die or frame A, which may be formed much like the die now in general use, is provided with a series of rollers, $a$, journaled in both its sides. The groove in the first of these rollers is somewhat V-shaped, and the edges of the bar or sheet engage and fit in the V part of the roll. The groove in the second roller conforms more to the arc of a circle, and so on until the rollers and the top and bottom of the frame A make the required form to shape the bar into a tube or pipe skelp.

In the bottom of the frame A is an opening, B, extending the whole length of the die. This opening allows the insertion of a pair of tongs, by which the bar or sheet is drawn through the die. In the top of the die-frame is an opening, $b$, which extends from the mouth about half the length of the die. This opening allows the workman to watch the bar or sheet during the operation, and to correct any tendency to buckling.

The rolls $a$ extend above the inside surface of the frame A, as shown in the drawing, and thus partially support the skelp, and lessen the friction between the skelp and the bottom of the die; or, in other words, the grooves of the rolls do not exactly coincide with the curved face of the frame, but form an offset at $e$, by which means the skelp is, to a certain extent, supported or held out of contact with the frame proper, thus reducing greatly the friction. The rollers also extend higher on one side of the die-frame than on the other, as shown in the drawing. This causes one edge of the skelp to overlap the other, so that the lap-weld may be made.

The iron having been heated, one end of it is placed in the mouth of the die, caught by a pair of tongs through the opening B, and the bar or sheet is drawn through the die. The edges of the bar, meeting the curved surfaces of the rolls, are gradually bent around until a cylinder or skelp-tube is formed, one edge, however, overlapping the other, so that the edges may be readily welded after the skelping operation is finished.

In making butt-weld tubing the rolls will, of course, be of equal height on both sides.

The skelping-die is fastened to the draw-table just in front of the endless chain, and the tongs are inserted from the small end, the sheet of metal is seized, and then hooked onto a link of the endless chain by means of a hook at the handles, and the plate of iron is drawn through the skelping-die.

Having thus described my invention, what

I claim, and desire to secure by Letters Patent, is—

1. In combination with the frame, a series of rolls arranged within the same, substantially as and for the purpose specified.

2. In combination with the frame, the series of rolls arranged therein, the rolls of one side exceeding in height those of the other side, substantially as and for the purpose specified.

3. In combination with the frame, a series of grooved rolls arranged therein, the grooves being of such shape as to form an offset next the bottom of the die and support the skelp, substantially as and for the purpose specified.

In testimony whereof I, the said HENRY C. EVANS, have hereunto set my hand.

HENRY C. EVANS.

Witnesses:
T. B. KERR,
JAMES I. KAY.